(12) United States Patent
Roy et al.

(10) Patent No.: US 7,850,759 B2
(45) Date of Patent: Dec. 14, 2010

(54) METAL EXTRACTION FROM VARIOUS CHALCOGENIDE MINERALS THROUGH INTERACTION WITH SEPARATE ELECTRIC FIELDS AND MAGNETIC FIELDS SUPPLIED BY ELECTROMAGNETIC ENERGY

(75) Inventors: Rustum Roy, State College, PA (US); William Moeller, Alpine, UT (US)

(73) Assignee: American Biotech Labs, LLC, Alpine, UT (US)

( * ) Notice: Subject to any disclaimer, the term of this patent is extended or adjusted under 35 U.S.C. 154(b) by 0 days.

(21) Appl. No.: 12/335,398

(22) Filed: Dec. 15, 2008

(65) Prior Publication Data

US 2009/0183597 A1    Jul. 23, 2009

Related U.S. Application Data

(63) Continuation-in-part of application No. PCT/US2007/071251, filed on Jun. 14, 2007.

(60) Provisional application No. 60/804,808, filed on Jun. 14, 2006.

(51) Int. Cl.
*C22B 3/22* (2006.01)
*C22B 11/00* (2006.01)

(52) U.S. Cl. .................... 75/10.13; 75/10.67

(58) Field of Classification Search ............. 75/10.13, 75/10.67
See application file for complete search history.

(56) References Cited

U.S. PATENT DOCUMENTS

| 5,393,320 | A  | * | 2/1995  | Gomez ........................ 75/10.67 |
| 6,350,420 | B1 | * | 2/2002  | Duyvesteyn et al. ......... 423/139 |
| 6,365,885 | B1 | * | 4/2002  | Roy et al. .................... 219/750 |
| 2003/0029944 | A1 | | 2/2003 | Flinn et al. |
| 2004/0187643 | A1 | | 9/2004 | Beckmann |
| 2004/0258591 | A1 | * | 12/2004 | Birken ...................... 423/150.6 |

FOREIGN PATENT DOCUMENTS

| WO | WO-03/031664 | 4/2003 |
| WO | WO-03/046231 | 6/2003 |

* cited by examiner

*Primary Examiner*—George Wyszomierski
*Assistant Examiner*—Tima M McGuthry-Banks
(74) *Attorney, Agent, or Firm*—Venable LLP; Stefan J. Kirchanski (57) ABSTRACT

Multimode and single mode microwave energy is used to improve the extraction of metals from chalcogenide minerals. In one process microwave energy is used to comminute the mineral after which the mineral is reacted with acid in the presence of microwave energy. Following treatment the mineral is removed and the extracted metal is recovered from the acid. In another process chalcogenide minerals are exposed to the magnetic field maximum or the electrical field maximum of a single mode electromagnetic energy. This treatment causes a phase separation between metals and silicates within the mineral leaving metal rich regions from which the metal can be readily recovered by traditional methods.

15 Claims, 11 Drawing Sheets

METAL EXTRACTION FROM VARIOUS CHALCOGENIDE MINERALS THROUGH INTERACTION WITH SEPARATE ELECTRIC FIELDS AND MAGNETIC FIELDS SUPPLIED BY ELECTROMAGNETIC ENERGY

CROSS-REFERENCE TO PRIOR APPLICATIONS

This application is a Continuation-in-Part of and claims priority from PCT/US2007/071251 designating the United States and filed on 14 Jun. 2007 which application was the non-provisional version of U.S. Provisional Patent Application No. 60/804,808 and claimed the priority and benefit of that application.

U.S. GOVERNMENT SUPPORT

Not Applicable

BACKGROUND OF THE INVENTION

1. Area of the Art

This invention involves the application of microwave technologies to the assaying and extraction of metals such as gold and silver from their ores.

2. Description of the Background Art

Microwave energy may be useful in several ways in enhancing the extraction and recovery of trace metals from its ores. The basis of exploiting microwaves for extraction lies in the fact that microwaves are more readily absorbed by some minerals than others, leading to a preferential heating of such minerals. This preferential heating may result in different effects to those obtained by application of conventional thermal energy. Mineralogy can be expected to play an important part in the application of microwave energy to the treatment of gold ores because some minerals absorb microwave energy and become hot, and may decompose or react with oxygen or other substances. Other minerals however are 'transparent' to microwave energy and hence unaffected.

Nevertheless, minerals which are transparent at ambient temperatures may absorb microwave energy at higher temperatures. Gold is considered to be refractory when it cannot be easily recovered by alkaline cyanide leaching. The vast majority of refractory gold occurs in chalcogenide minerals such as pyrite ($FeS_2$), arsenopyrite (FeAsS) and pyrrhotite (FeS). Generally, refractory gold concentrate or ore is pretreated by roasting, oxygen pressure leaching or bacterial leaching, to render it amenable to gold recovery by alkaline cyanide leaching. Because chalcogenide minerals are in general heated easily by microwaves, it is possible to pre-treat chalcogenide refractory gold concentrates by microwave energy. However, conventional microwave energy does not seem adequate.

While the application of microwave energy in technology has been explored worldwide for five decades as a way of saving energy, it has not come into use for any high temperature ($>\approx 600°$ C.) applications. Over the past twenty years research the senior inventor and his group has made a major contribution to understanding and application of microwave energy in various fields of materials science [1-20].

The fundamental conceptual error in all previous research has been the mistaken belief that microwaves provide only an alternative source of thermal energy: i.e. that a material heated to say 800° C. in a resistance electric or gas-fired furnace is affected in an identical manner to one heated by microwaves. This view has now been superseded [18, 19].

In 2002 in a paper [21] and patent [22, U.S. Pat. No. 6,365,885, issued Apr. 2, 2002] issued to one of the current inventors, it was shown that the E (electrical) and H (magnetic) fields in a 2.45 GHz microwave reactor interact very differently with matter. For the first time it was demonstrated that the microwave field itself, independent of temperature, profoundly affected the thermodynamics of any system where 3d and 4f electrons have unpaired spins. This important effect is realized with single mode microwave radiation where the point of maximal E field and H field are spatially separated.

This hitherto unknown phenomenon is what we utilize in our present invention—the change of the stability of a phase such as a gold or silver bearing mineral by the E and H fields of the microwave radiation. In many cases the resulting phase change causes the stabilization of a new phase assemblage, most of which include the separation from the ore of a phase of the metallic element.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide methods employing microwave energy to enhance the extraction of refractory gold and other noble metals from certain ores.

Over the last decade or so there have been a realization that gold is present in many ores in two different forms—one much more available for extraction by sodium cyanide than the other [23]. From our examination of the data it appears that the easily accessible form is present as the native metal. The much less accessible form we have found is made up of the various complex chalcogenide minerals. There has long been used in the trade a practice of "roasting" the ore to thereby make the gold or other metal more available [24, 25]. No mechanism to explain the effectiveness of this practice has been systematically presented. In some cases [26] conventional microwave energy has been utilized as the heat source for the roasting.

Figure 1:
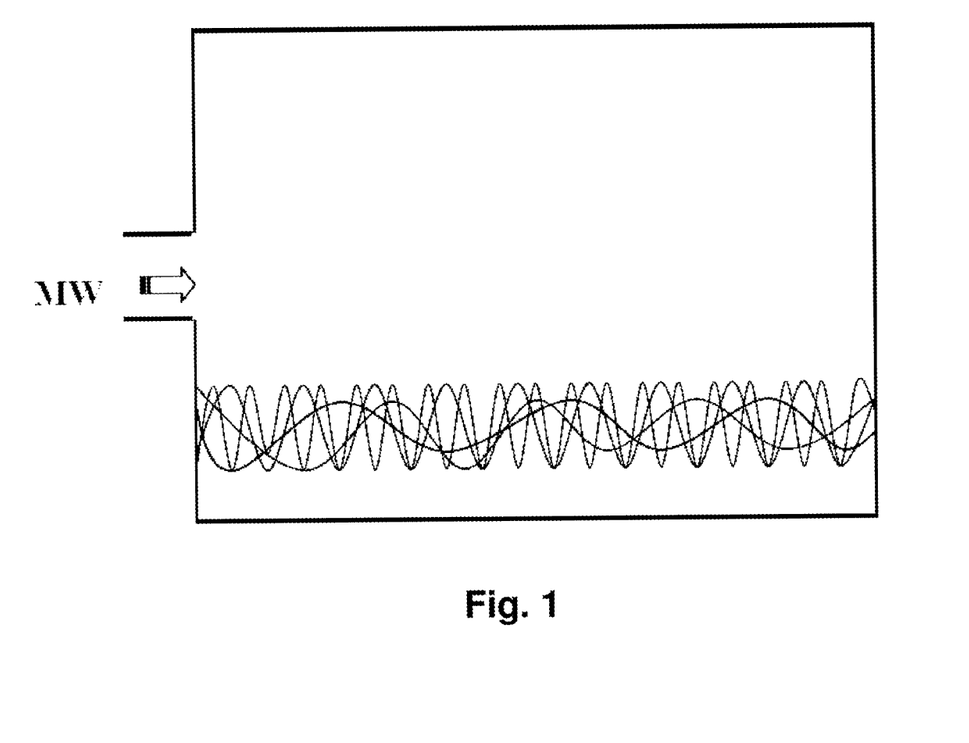
FIG. 1 is a diagrammatic representation of a multimode microwave cavity.

Although microwave energy is largely thought of as another heat source, there are actually different forms of microwave energy and each form can have different effects. FIG. 1 is a diagrammatic representation of conventional multimode microwave energy in a cavity 14 designed for microwave exposure of any material objects placed therein. The microwaves 12 are produced by a generator (not shown) and conducted to the cavity through a waveguide 16. The microwaves 12 are shown within the cavity as a plurality of sine waves of various different frequencies. The system is multimode because tens to hundreds of different modes are present. Because the waves are not at all coherent, the E (electrical) and H (magnetic) fields of the various waves are evenly spread through the cavity and any material placed therein will receive equal exposure to both E and H fields. In some cases, such uniform treatment is advantageous and is particularly good for treating large batches of material uniformly since material located at any point within the cavity will receive essentially the same treatment. It is not possible to expose material to extremely intense E or H fields so that the primary use of multimode microwave treatment is to heat the material. To maximize the heating effect it is often necessary to provide a "heater" of microwave susceptible material (e.g., silicon carbide) within the cavity. The "heater" absorbs microwave energy, become very hot and transmits the heat to the sample.

Figure 2:
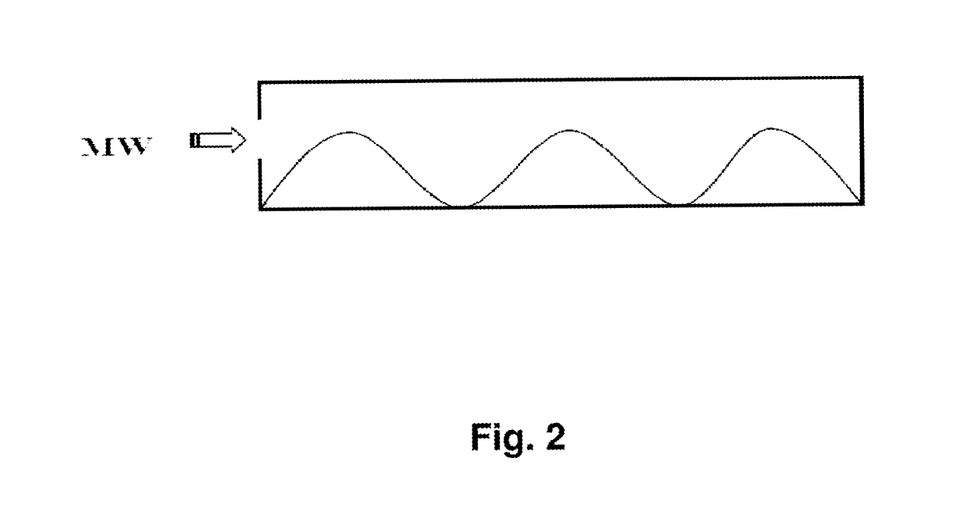
FIG. 2 is a diagrammatic representation of a single mode microwave cavity.
Figure 3:
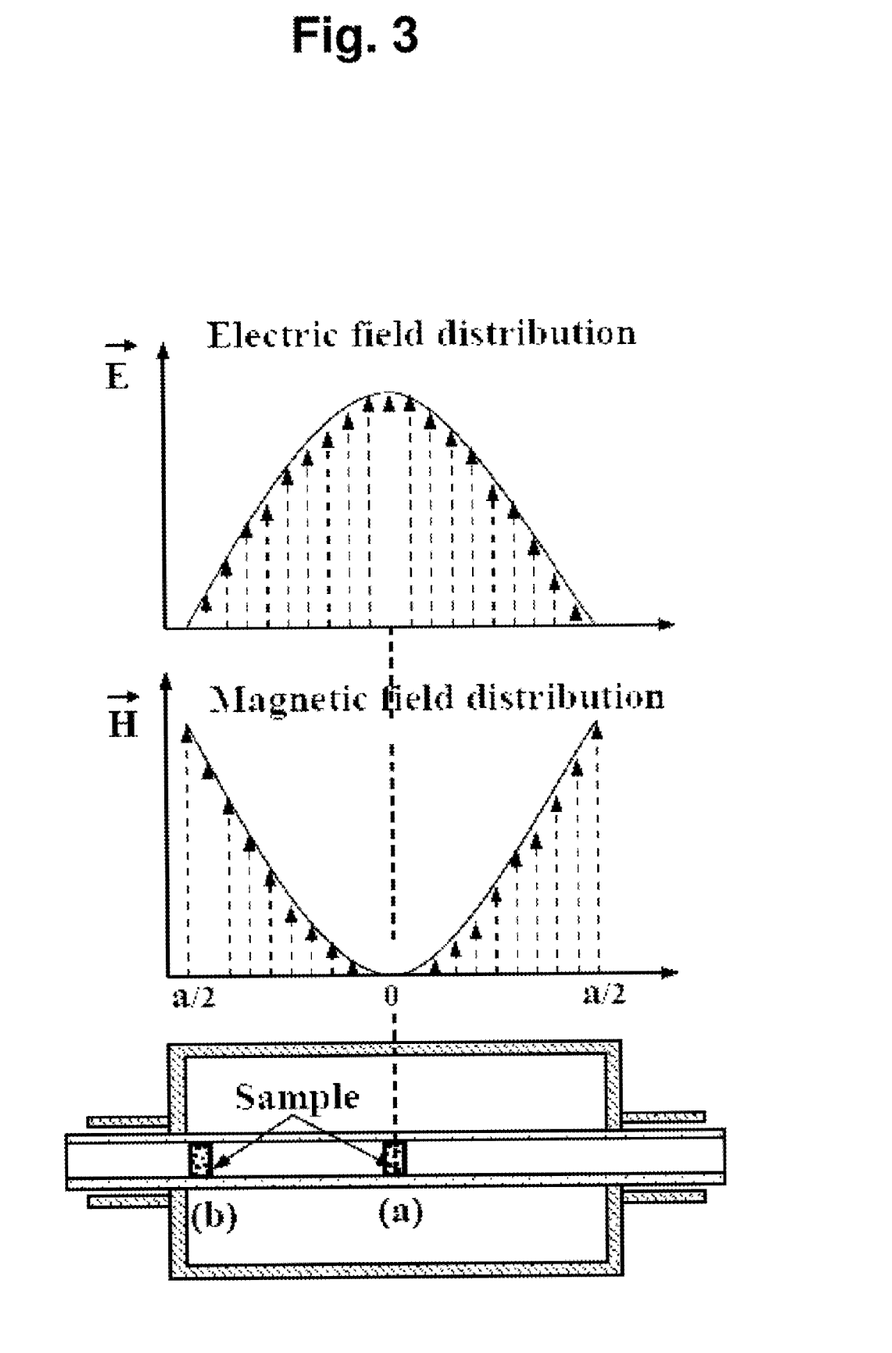
FIG. 3 is a diagram showing the positions of maximum E field and maximum H field in a single mode microwave cavity.

FIG. 2 is a diagrammatic representation of a single mode cavity 14 ($TE_{103}$). Again the microwaves 12 are produced by a generator (not shown) and conducted to the cavity through a waveguide 16. Here the microwaves 12 are essentially coherent and standing waves are produced in the cavity 14. This means that different spatial regions within the cavity experience intense E fields or intense H fields (i.e., at the nodes of the waves). This is shown diagrammatically in FIG. 3. Samples 20 within a quartz tube 22 passes through the single mode cavity 14. At position (a) the sample 20 experiences maximum electrical E field and minimum magnetic H field. At a second position (b) the sample 20 experiences maximum magnetic H field and minimum electrical E field. A plot 22 of the E field intensity and a plot 24 of the H field intensity are plotted above and in registration with the cavity 14 demonstrating the relationship of the alternating electrical and magnetic fields with the positions (a) and (b). An advantage to a single mode microwave device is the ability to treat the sample separately with a very intense E filed or a very intense H field. A potential problem is that of treating large quantities of material. However, it is possible to significantly increase the cavity size and move the sample (as on a conveyor belt) to position (a) and/or position (b) to receive the desired treatment. It will be apparent to one of skill in the art that other electromagnetic radiation other than microwaves can be used to expose material to separate and intense H and E fields. However, microwaves are convenient because of the physical size of the standing H and E fields. Use of radiation with a much shorter wavelength would result in H and E fields of impractically small sizes.

Thus, it is possible to treat ores with either multimode or single mode microwave energy. We have observed that the microscopic structure of the particular ore influences the optimal strength of microwave radiation and time of exposure used.

Multimode microwaves are largely involved in heating the ore (similar to convention "roasting") whereas single mode microwave treatment permits separate treatments with intense E fields or intense H fields.

Multimode Treatment

While multimode microwaves can be considered largely a source of heat, multimode energy can be used in novel ways to extract the gold or silver metal from the treated ore by means of a microwave-hydrothermal reactor. This reactor contains acid, either aqua regia (hydrochloric plus nitric acids) for gold extraction or nitric acid for silver extraction and can advantageously be used in place of heap leaching or other similar processes to extract metal from ground or otherwise pretreated ore.

A laboratory example of this process operates as follows: 1) comminuted ore (about 50 g) is exposed to a 2.45 GHz multimode microwave field of about 500 W for 15-30 minutes to further fracture the ore and enhance extractability; 2) the ore is then transferred to a microwave-hydrothermal device wherein the appropriate acid is placed within a microwave transparent contained located within the cavity of the device; 3) the container is exposed to a 2.45 GHz multimode microwave field of about 500 W for 15-60 minutes; 4) the liquid solution containing dissolved noble metals is decanted and filtered off; and 5) the metal is then precipitated from the acid solution by the usual procedures well known to those of ordinary skill in the art.

Single Mode Treatment

In spite of claims in various papers and patents it is not clear what reactions are involved in making the metallic element—such gold—available from the chalcogenide minerals—typical ore minerals such as sylvanite, petzite, arsenopyrite and hessite. Building on our previous work we treated key gold phases of these minerals in single mode microwave cavities, and followed the treatment by means of SRD, SEM (scanning electron microscope), EDAX (energy dispersive x-ray microanalysis), TEM (transmission electron microscope), and similar techniques. Based on that it is quite clear that the microwave-valence electron interaction is the scientific vector for changing the phase assemblages in microwave treated gold ores, to make the gold available.

As mentioned above, the senior inventor and others of skill in the art have shown that the magnetic field at the microwave frequencies strongly interacts with metal particles. In the present invention the inventors exposed typical gold and silver ores to 2.45 GHz single mode microwave fields (at power levels of up to about 100 W). Due to the thermal expansion mismatch, the rock cracks and fissures, but surprisingly the very hot metal particles which are formed within seconds of microwave exposure separate readily from the enclosing minerals upon cooling, and thereby become much more accessible to traditional extraction processes. Ore processed in this manner shows higher values of extractable precious metal than ore processed by typical heat or other treatments. Essentially, the treatment results in a separation (or disproportionation) of the mineral into several different phases one of which is primarily free metal.

In the description below, we have the exemplified the use of microwaves using a particular mineral sample, henceforth referred to as DMR-3, which is a mixture of hessite, petzite and native gold. Small pieces of the mineral, ~2×2 mm dimension, were irradiated in a single mode microwave, in an intense H field and the phase evolution monitored using Energy Dispersive X-ray analysis as shown in the figures. Either intense H fields or intense E fields can have the desired disproportionation effect. The choice of one over the other will depend on the properties of the ore. The tests described below enable one to determine readily which field is the most effective in a particular case.

Figure 4:
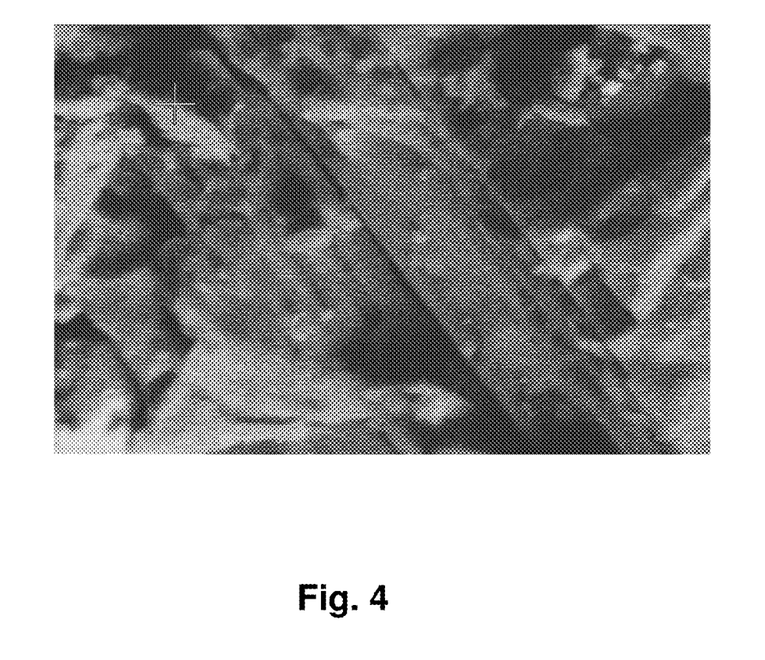
FIG. 4 is a micrograph of a mineral sample (DMR-3) in its native state.
Figure 5:
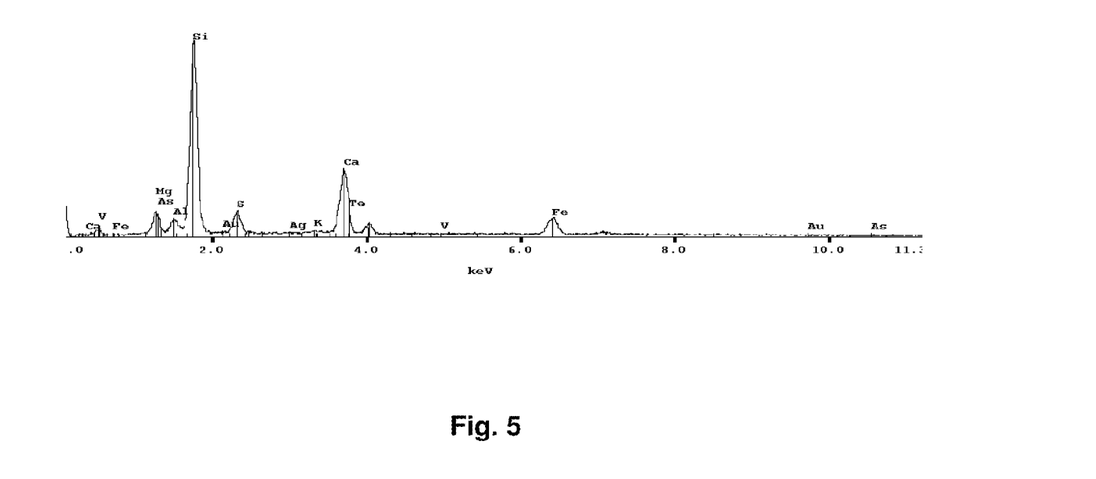
FIG. 5 is an Energy Dispersive X-ray analysis of the material shown in FIG. 4.

FIG. 4 shows a micrograph (×2,000) of DMR-3 in its native state. Note the relative uniform appearance. The accompanying Energy Dispersive X-ray analysis (FIG. 5) shows primarily a calcium-aluminum silicate mineral signature with a very low Ag/Au signal.

Figure 6:
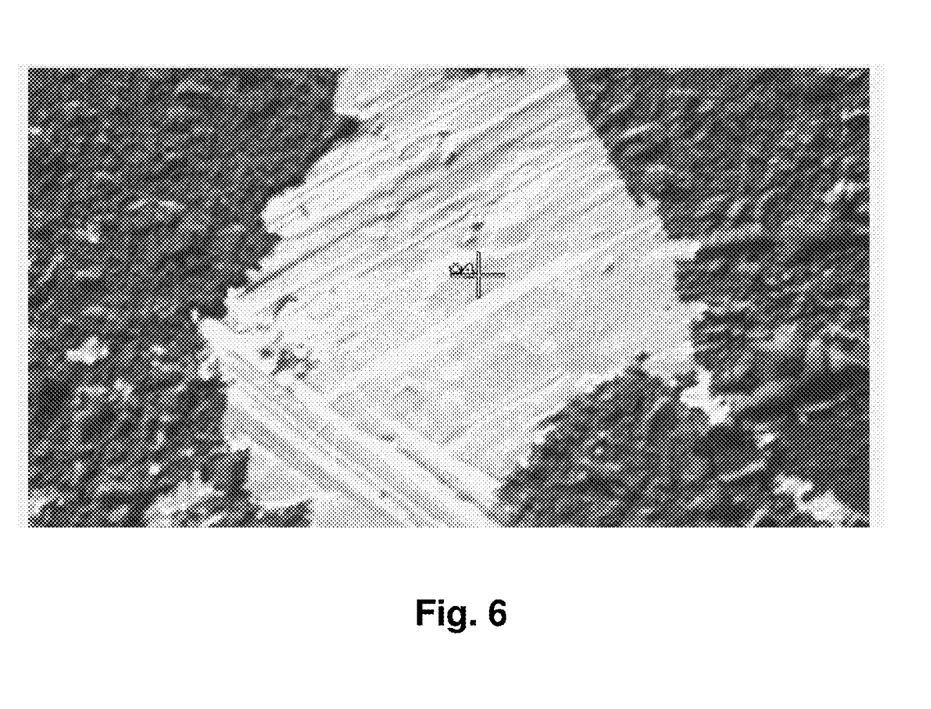
FIG. 6 is a scanning electron micrograph of a mineral sample (DMR-3) treated for thirty seconds at H field maximum.
Figure 7:
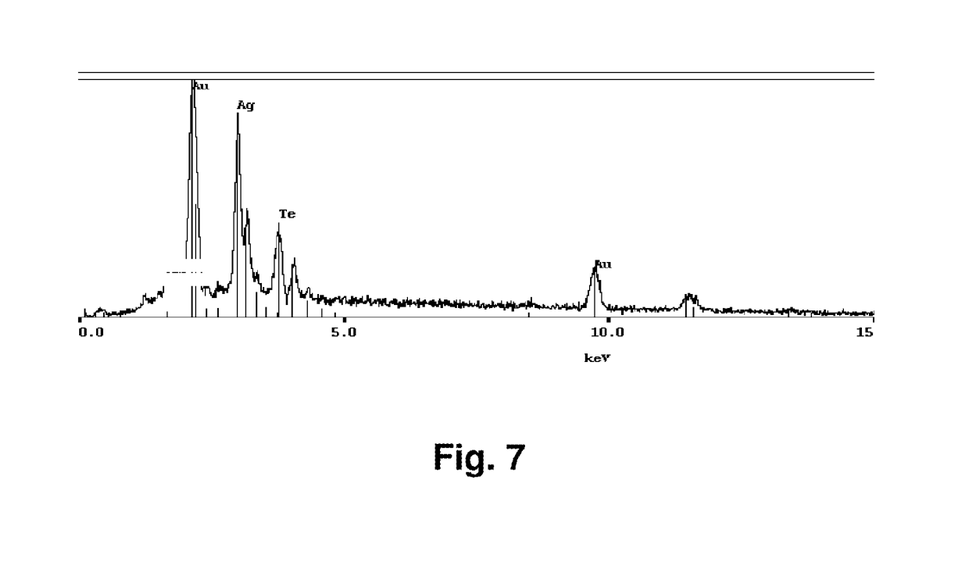
FIG. 7 is an Energy Dispersive X-ray analysis of the material shown in FIG. 6.

The DMR-3 mineral samples were treated for up to three minutes with a step size of 30 sec (i.e., 0.5 min, 1.0 min, 1.5 min, 2.0 min, 2.5 min and 3.0 min) and the evolution of the Au/Ag phases was monitored. FIG. 6 shows a scanning electron micrograph of DMR-3 treated for thirty seconds in the H field maximum. Note that there is already a separation of a metallic phase (marked with "+"). An X-ray analysis of this region is shown in FIG. 7 which confirms a strong Ag/Au signal. Note that there is micro-heterogeneity in DMR-3 so that some samples may contain more Ag while others contain more Au. The present treatment concentrates whatever metal is present.

Figure 8:
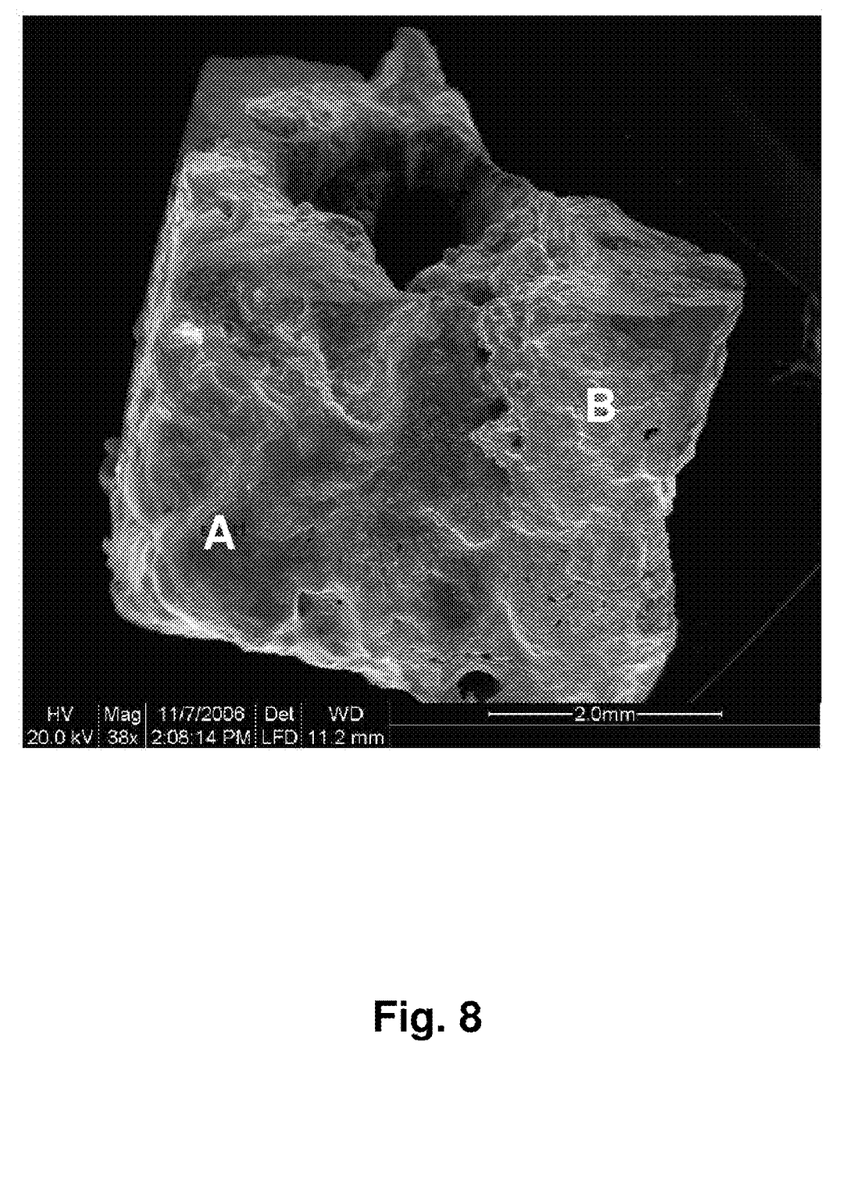
FIG. 8 is a micrograph of a mineral sample (DMR-3) treated for sixty seconds at H field maximum.
Figure 9:
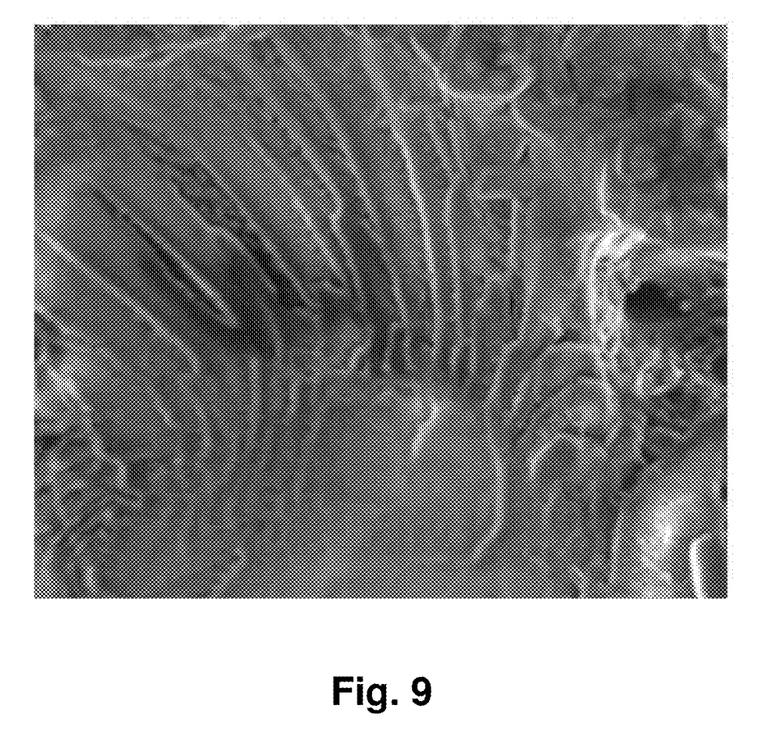
FIG. 9 is a micrograph of a portion of the sample shown in FIG. 8 at A.
Figure 10:
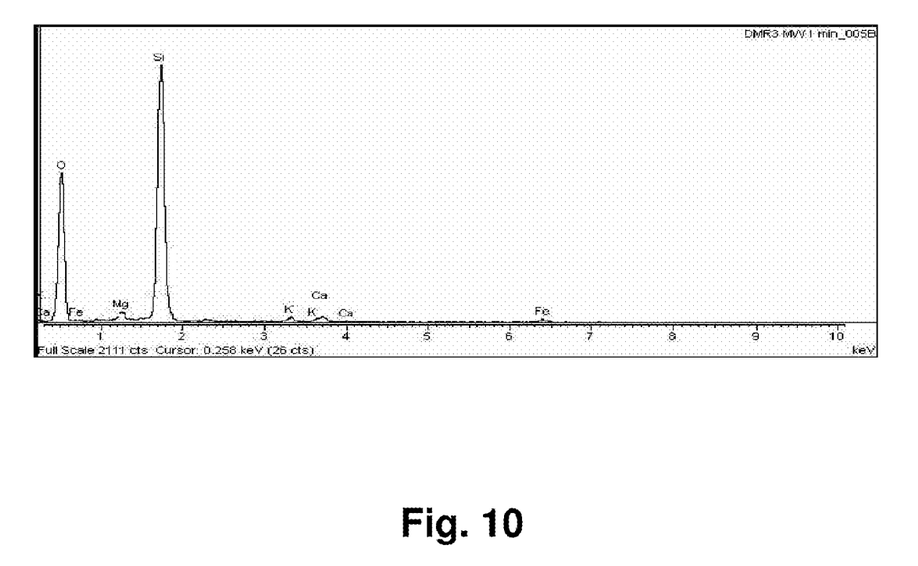
FIG. 10 is an Energy Dispersive X-ray analysis of the portion shown in FIG. 9.
Figure 11:
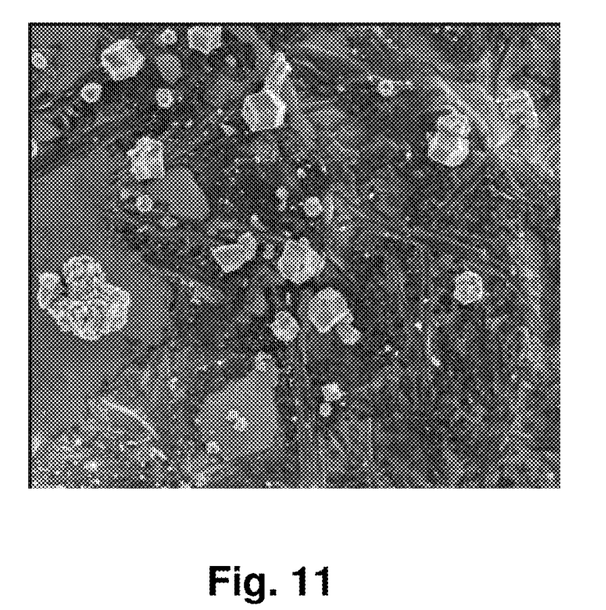
FIG. 11 is a micrograph of a portion of the sample shown in FIG. 8 at B.
Figure 12:
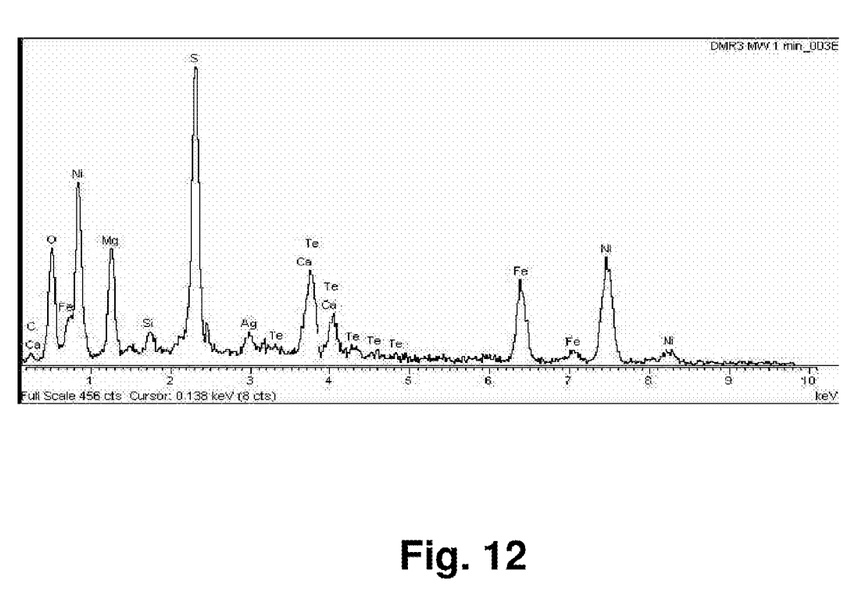
FIG. 12 is an Energy Dispersive X-ray analysis of the material shown in FIG. 11.
Figure 13:
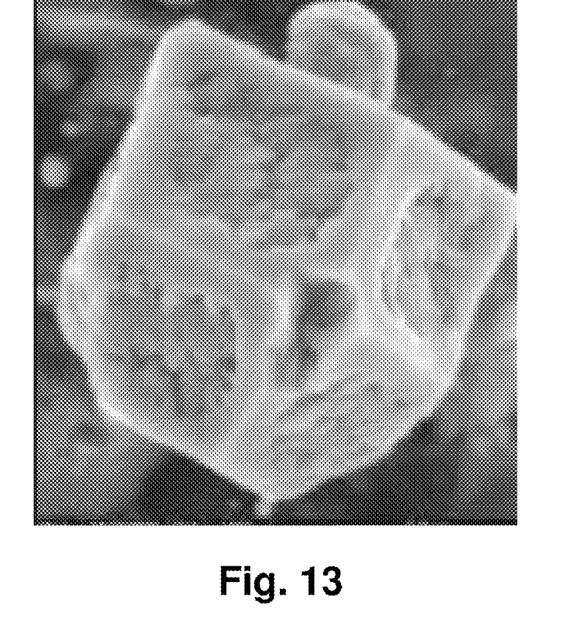
FIG. 13 is a close up of one of the cuboids shown in FIG. 11.
Figure 14:
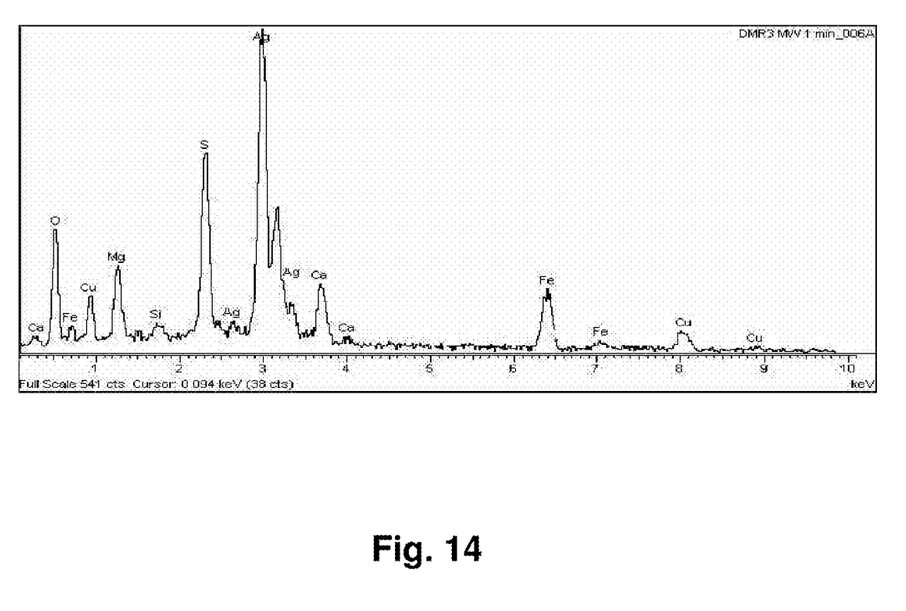
FIG. 14 is an Energy Dispersive X-ray analysis of the region shown in FIG. 13.

FIG. 8 shows a sample of DMR-3 ore that has been treated in the H field maximum for one minute. FIGS. 9 and 11 show two different regions of the sample of DMR-3 ore shown in FIG. 8. The X-ray analysis (FIG. 10) of material shown in FIG. 9 indicates that this region contains most of silica phases. FIG. 11 shows cuboids of metallic phase. X-ray analysis (FIG. 12) of the material of FIG. 11 suggests that the cuboids contain concentrated silver phases (note the elevation of metal signals as compared to FIG. 10). This is verified by FIG. 13 (a close up of one of the cuboids from FIG. 11) and the specific analysis (FIG. 14) of this region which shows a strong silver signal. This demonstrates that unlike the more general heating of multi-mode microwaves, interaction of ore with an intense H field of single mode microwaves results in much more effective local melting and aggregation of metal.

Figure 15:
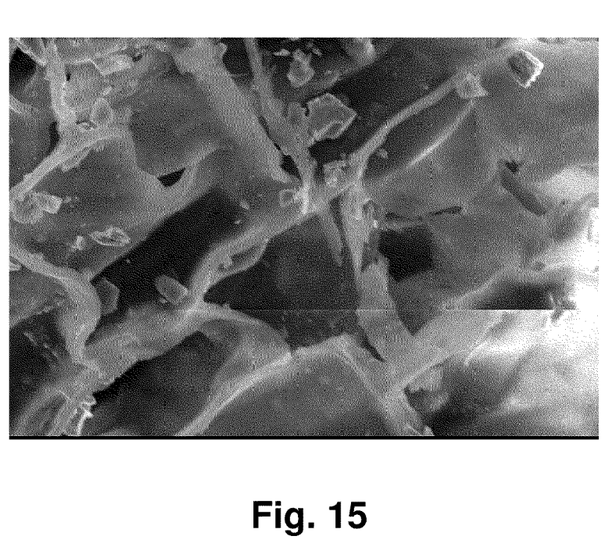
FIG. 15 is a micrograph of a mineral sample (DMR-1) prior to treatment.
Figure 16:
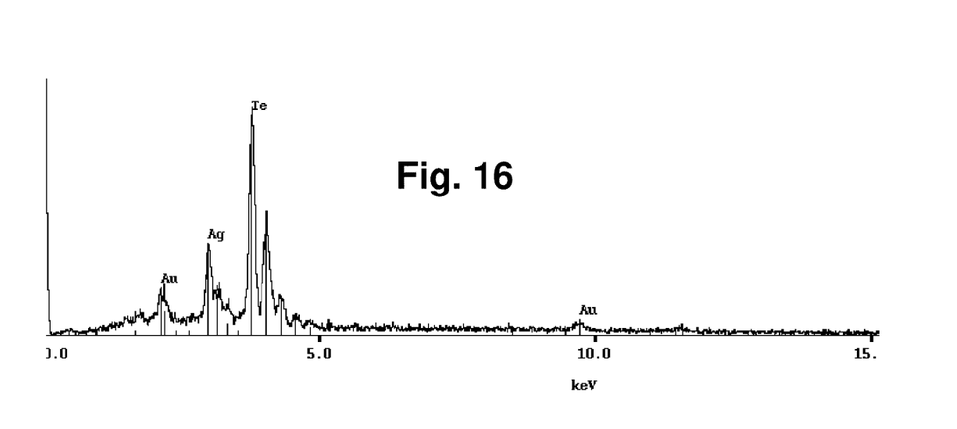
FIG. 16 is an Energy Dispersive X-ray analysis of the DMT-1 shown in FIG. 15.
Figure 17:
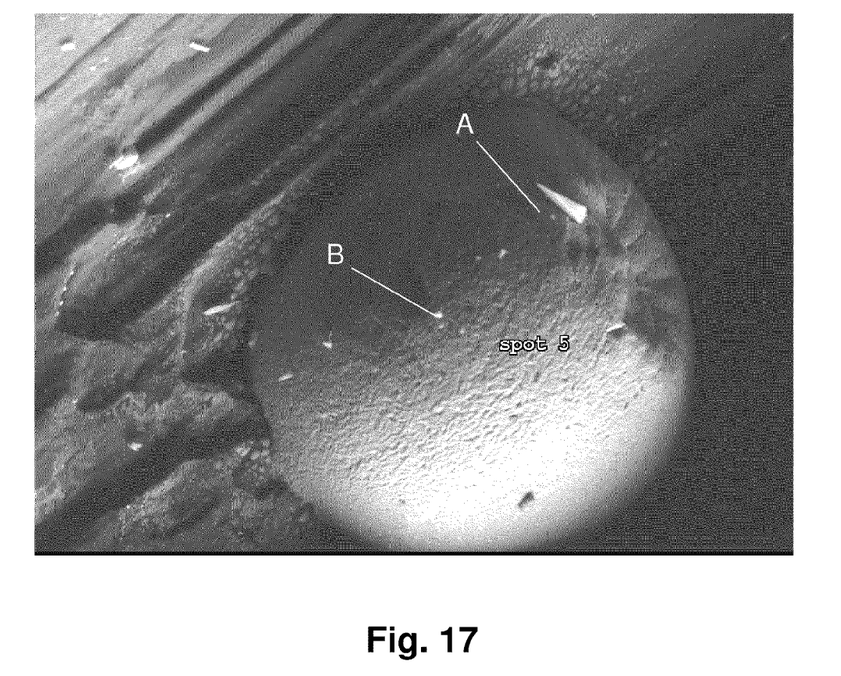
FIG. 17 is a micrograph of a portion of the sample shown in FIG. 15 following treatment in an E-field maximum for 120 sec.
Figure 18:
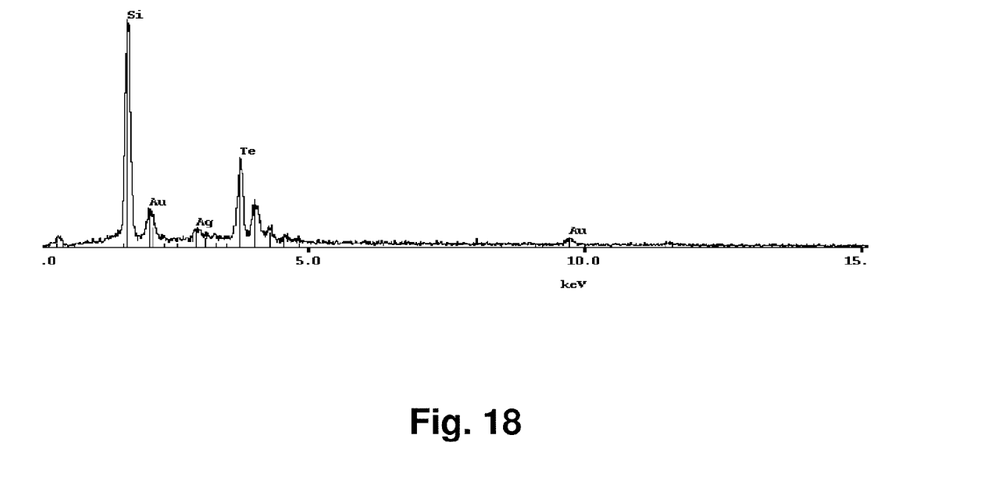
FIG. 18 is an Energy Dispersive X-ray analysis of a portion (at A) of the material shown in FIG. 17.
Figure 19:
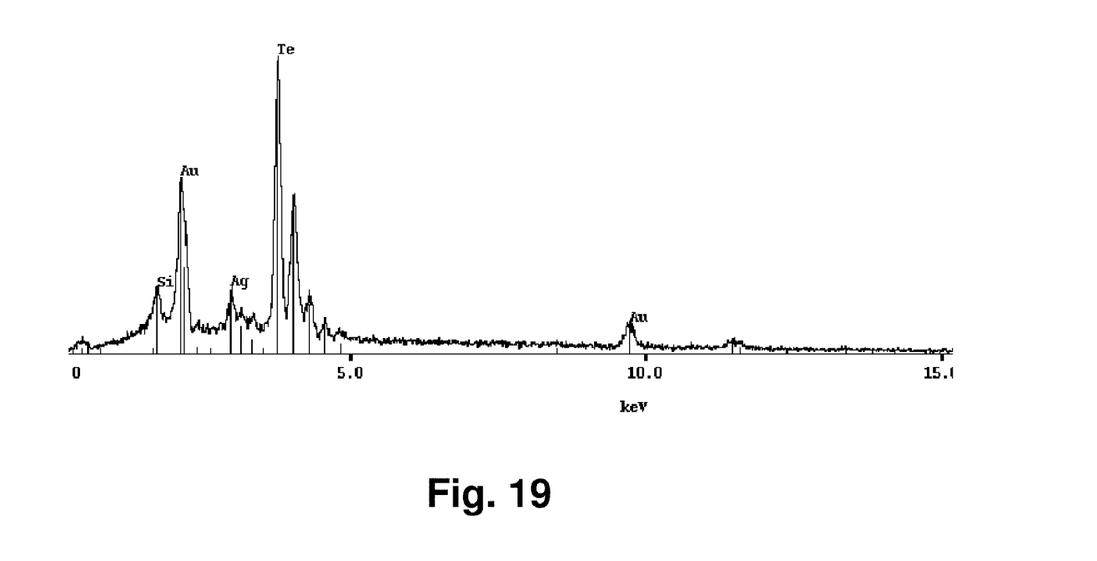
FIG. 19 is an Energy Dispersive X-ray analysis of a portion (at B) of the material shown in FIG. 17.

Similar experiments were also carried out with samples of Krennerite ore (referred to here as DMR-1). In this case intense E field treatment was chosen. FIG. 15 shows the typical structure of a sample of the ore as an SEM (×1500). FIG. 16 shows the EDS X-ray analysis of the untreated ore sample. With as little as 10 sec. treatment with an intense E field, structural changes were readily apparent in the DMR-1. Maximal disproportionation of the metal signals was seen with 2 minutes exposure to the E field. FIG. 17 shows an SEM (×700) after such a treatment. Round globules are formed within the ore and clear phase separation occurs within the globules. Region A appears fairly uniform and an X-ray analysis of that region (FIG. 18) shows a significant enrichment for silicon as compared to the original ore. At B small blobs or perhaps crystals are apparent. X-ray analysis of this region (FIG. 19) shows a greatly increased metal signal suggesting that the blob is indeed primarily metal.

The enriched metal phases created by single mode microwave irradiation can be readily recovered by cyanide leaching or other traditional methods well known in the art. In addition ore that has been phase separated by single mode microwave treatment can be treated with the microwave-hydrothermal device described above for simple and rapid recovery of the metals.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

REFERENCES

1. Roy, R., Peelamedu, P. D., Hurtt, L., Cheng, J. P. and Agrawal, D., "Definitive experimental evidence for Microwave Effects: Radically new effects of separated E and H fields, such as decrystallization of oxides in seconds," Mat. Res. Innovat., 6, 128-140 (2002).
2. D. Agrawal., J. Cheng, Y. Fang, and R. Roy, "Microwave Processing of Ceramics, Composites and Metallic Materials," Eds. David E. Clark, Diane C. Folz, Carlos E. Folgar, Morsi M. Mahmoud, Am. Cer. Soc. Publ., pp. 205-228 (2005).
3. L. N. Satapathy, P. D. Ramesh, D. Agrawal and R. Roy, "Microwave synthesis of phase-pure, fine silicon carbide powder," Materials Research Bulletin 40 1871-1882 (2005).
4. R. Roy, Y. Fang, J. Cheng and D. Agrawal, "Decrystallizing solid crystalline titania, without melting, using microwave magnetic fields," J. Amer. Ceram. Soc. 88[6] 1640-42 (2005)
5. E. Breval, J. Cheng, D. Agrawal, P. Gigl, M. Dennis, R. Roy and A. J. Papworth, "Comparison between Microwave and Conventional Sintering of WC/Co Composites" Mats. Sci Engin. A 391 285-295 (2005).
6. R. M. Anklekar, K. Bauer, D. K. Agrawal and R. Roy, "Improved mechanical properties and microstructural development of microwave sintered copper and nickel steel PM parts," Powder Metallurgy, March 2005, vol. 48, no. 1, pp. 39-46.
7. S. Agrawal, R. Guo, D. Agrawal and A. S. Bhalla, "Tunable BST: MgO Dielectric Composite by Microwave Sintering," Ferroelectrics," 300 155-163 (2004).
8. D. Agrawal, J. Cheng, R. Peelamedu, and R. Roy, "Microwave Processing of Ceramics and Metallic Materials: Developments at Penn State," Current Adv. In Mats and Processing, 17 670-673 (2004).
9. D. C. Dube, P. D. Ramesh, J. Cheng, M. T. Lanagan, D. Agrawal and R. Roy, "Experimental evidence of redistribution of fields during processing in a high-power microwave cavity," Appl. Phys. Lett, 85(16), 3632-3624 (2004)
10. B. Vaidhyanathan, D. K. Agrawal and R. Roy, "Microwave synthesis and sintering of [NZP] compounds," J. Amer. Ceram. Soc. 87[5] 834-839, 2004.
11. Ramesh Peelamedu, R. Roy, D. Agrawal and W. Drawl, "Field de-crystallization and structural modification of highly doped silicon in a 2.45 GHz microwave single-mode cavity," J. Mater. Res. 19[6] 1599-1602 (2004).

12. Y. Fang, D. Agrawal and R. Roy, "Effect of Powder Reactivity on Microwave Sintering of Alumina," Mater. Lett. 58 498-501 (2004).
13. Purushotham Yadoji, Ramesh Peelamedu, Dinesh Agrawal, and R. Roy, "Microwave Sintering of Ni—Zn Ferrites: Comparison with Conventional Sintering," Mat. Sci.& Engg. B98 269-278 (2003)
14. D. Agrawal, E. Breval, J. Cheng, P. Gigl and R. Roy, "Graded steel-tungsten carbide/cobalt diamond systems using microwave heating," Functionally Graded Materials Technology Leveraged Applications, Proc. Of 2002 Intl. Conf. MPI Publ. Pp 50-58 (2002).
15. Cheng-Yu Hsieh, Chun-Nan Lin, Hung-Jia Chen, Shyan-Lung Chung, Jiping Cheng and Dinesh K. Agrawal, "Microwave Sintering of a combustion Synthesized AlN powder", J. Chin. Inst. Chem. Engrs, 30 (6):621-629 (2002).
16. Roy, R., Peelamedu, P. D., Cheng, J. P., Grimes, C. and Agrawal, D., "Major phase transformations and magnetic property changes caused by electromagnetic fields at microwave frequencies," J. Mater. Res. 17(12), 3008-3011 (2002).
17. Roy, R., Peelamedu, P. D., Hurtt, L., Cheng, J. P. and Agrawal, D., "Definitive experimental evidence for Microwave Effects: Radically new effects of separated E and H fields, such as decrystallization of oxides in seconds," Mat. Res. Innovat., 6, 128-140 (2002).
18. Roy, R., Peelamedu, P. D., Hurtt, L., Cheng, J. P. and Agrawal, D., "Definitive experimental evidence for Microwave Effects: Radically new effects of separated E and H fields, such as decrystallization of oxides in seconds," Mat. Res. Innovat., 6, 128-140 (2002).
19. D. Agrawal, J. Cheng, R. D. Peelamdu and R. Roy, "Effect of Microwave Electric and Magnetic Fields in Single Mode Cavity on Materials Processing," in Proc. Of Intl. Symp. On Microwave Science and its Application to Related Fields, Nara (Japan), Nov. 21, 2002, Page 8-9.
20. Ramesh D. Peelamedu, Mary Fleming, D. Agrawal and R. Roy, "Preparation of Titanium Nitride: Microwave-Induced Carbothermal Reaction of Titanium Dioxide," J. Amer. Ceram. Soc. 85[1], 117-22 (2002).
21. J. Cheng, R. Roy and D. Agrawal, "Radically different effects on materials by separated microwave electric and magnetic fields," Mat. Res. Innov., 5, 170-177 (2002).
22. J. Cheng, R. Roy, and D. Agrawal, "Microwave processing in pure H fields and pure E fields," U.S. Pat. No. 6,365,885, Issued Apr. 2, 2002.
23. K. J. Henley, N. C. Clarke and P. Sauter, "Evaluation of a diagnosis leaching technique for gold in native gold and gold+silver tellurides," Minerals Engrg 14[1], 1-12 (2001).
24. J. Dunn, A. S. Ibrado and J. Graham, "Pynolyses of arsenopyrite for gold ore recovery by cyanidation," Minerals Engrg 8[4-5], 459-471 (1995).
25. N. Patnaik and R. B. Rao, "Microwave energy in mineral processing—a review, 1E(I) J Mining Engrg, February 2004, paper 4.
26. M F Almeida, "Leaching of a gold bearing partially roasted sulphide. Laboratory Scale Studies, Mater Res v. 4 is 0.4, Sao Carlos out. 2001.

What is claimed is:

1. A process for disproportionation of ore minerals into metallic and non-metallic phases comprising the step of exposing a ore mineral separately to magnetic and electric fields of single mode electromagnetic radiation.

2. The process according to claim 1, wherein the ore mineral is a chalcogenide ore mineral.

3. The process according to claim 2, wherein the chalcogenide ore mineral is selected from the group consisting of sylvanite, petzite, arsenopyrite, hessite and combinations thereof.

4. The process according to claim 1, wherein the single mode electromagnetic radiation is microwave radiation.

5. The process according to claim 4, wherein said microwave radiation has a frequency of about 2.45 GHz.

6. The process according to claim 1, wherein the ore mineral is exposed to the magnetic field of single mode electromagnetic radiation.

7. The process according to claim 6, wherein said mineral is exposed for a period of about 0.5 to about 3 minutes.

8. The process according to claim 1, wherein the ore mineral is exposed to the electrical field of single mode electromagnetic radiation.

9. The process according to claim 8, wherein said mineral is exposed for a period of about 0.5 to 3 minutes.

10. The process according to claim 1, wherein the ore mineral is a gold bearing mineral.

11. The process according to claim 1, wherein the ore mineral is a silver bearing mineral.

12. A process for extracting noble metals from a chalcogenide mineral comprising the steps of:
   comminuting the chalcogenide mineral to increase friability comprising treating the chalcogenide mineral with a first microwave field;
   extracting the comminuted chalcogenide mineral by placing it in a container of acid and exposing the container to a second microwave field, thereby extracting noble metal from the comminuted chalcogenide mineral;
   removing the comminuted chalcogenide mineral from the acid; and
   precipitating extracted noble metal from the acid.

13. The process according to claim 12, wherein the first and the second microwave fields are multimode microwave fields.

14. The process according to claim 12, wherein the first and the second microwave fields are microwave fields with a frequency of about 2.45 GHz.

15. The process according to claim 12, wherein the acid is selected from the group consisting of aqua regia and nitric acid.

* * * * *